US009625693B2

(12) United States Patent
Honda (10) Patent No.: US 9,625,693 B2
(45) Date of Patent: Apr. 18, 2017

(54) OBSERVATION APPARATUS (71) Applicant: OLYMPUS CORPORATION, Shibuya-ku, Tokyo (JP)

(72) Inventor: Susumu Honda, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/957,403

(22) Filed: Dec. 2, 2015

(65) Prior Publication Data

US 2016/0161729 A1 Jun. 9, 2016

(30) Foreign Application Priority Data

Dec. 5, 2014 (JP) ................. 2014-246951

(51) Int. Cl.
*G02B 26/08* (2006.01)
*G02B 21/00* (2006.01)

(52) U.S. Cl.
CPC ..... *G02B 21/0048* (2013.01); *G02B 21/0032* (2013.01); *G02B 21/0076* (2013.01)

(58) Field of Classification Search
CPC ........ G02B 21/06; G02B 21/64; G02B 21/00; G02B 21/18; G02B 21/0056; G02B 21/02; G02B 27/0025; G02B 21/0076; G02B 21/0032; G02B 21/361; G02B 26/0833; G02B 27/46
USPC ...................................... 359/238, 385, 201.2
See application file for complete search history.

(56) References Cited

U.S. PATENT DOCUMENTS

2007/0183029 A1\* 8/2007 Iketaki ............... G02B 21/0076
359/385
2011/0109958 A1 5/2011 Yokoi

FOREIGN PATENT DOCUMENTS

| JP | 2011099986 A | 5/2011 |
|----|--------------|--------|
| JP | 2012150238 A | 8/2012 |

\* cited by examiner

*Primary Examiner* — Euncha Cherry
(74) *Attorney, Agent, or Firm* — Holtz, Holtz & Volek PC (57) ABSTRACT

An object is to enable LSM observation while correcting aberrations, as well as illumination with a desired pattern, using a single LCOS. An observation apparatus of the present invention includes an objective lens that focuses laser light emitted from a light source and radiates the laser light onto a specimen; an LCOS disposed at a position optically conjugate with the pupil position of the objective lens and capable of modulating, according to a wavefront modulation pattern, the wavefront of the laser light to be radiated onto the specimen by the objective lens; a scanner disposed at a position optically conjugate with the LCOS and capable of two-dimensionally scanning the laser light to be radiated onto the specimen by the objective lens; a focusing mechanism that adjusts the focal position, in the specimen, of the objective lens in the optical axis direction; and a control unit that controls the LCOS such that the LCOS corrects aberrations at the focal position adjusted by the focusing mechanism and forms a desired illumination pattern on the specimen.

6 Claims, 3 Drawing Sheets

OBSERVATION APPARATUS

CROSS-REFERENCE TO RELATED APPLICATIONS

This application is based on Japanese Patent Application No. 2014-246951, the contents of which are incorporated herein by reference.

TECHNICAL FIELD

The present invention relates to an observation apparatus.

BACKGROUND ART

Conventionally, observation apparatuses having a phase-modulating spatial light modulator (liquid-crystal-on-silicon spatial light modulator: LCOS-SLM) are known (for example, see PTLs 1 and 2 below).

The observation apparatus disclosed in PTL 1 includes an LCOS, two galvanometer mirrors, and a relay optical system that relays the pupils of the two galvanometer mirrors. The wavefront of the laser light modulated by the LCOS is accurately relayed, via the two galvanometer mirrors, to an entrance pupil position of an objective optical system by the relay optical system. Thus, a laser scanning microscope (LSM) observation can be performed without deteriorating the light collecting ability.

The observation apparatus disclosed in PTL 2 includes an illumination light path in which the wavefront of the laser light is modulated by an LCOS and an illumination light path in which the laser light is scanned by a two-dimensional scanner. By simultaneously radiating the laser light in these illumination light paths onto a specimen, pattern illumination with the LCOS and LSM observation using the two-dimensional scanner can be simultaneously performed.

CITATION LIST

Patent Literature

{PTL 1} Japanese Unexamined Patent Application, Publication No. 2012-150238
{PTL 2} Japanese Unexamined Patent Application, Publication No. 2011-099986

SUMMARY OF INVENTION

The observation apparatus disclosed in PTL 1 does not perform pattern illumination with the LCOS. Furthermore, the observation apparatus disclosed in PTL 2 cannot perform LSM observation while correcting aberration, because the illumination light path for the LCOS and the illumination light path for the two-dimensional scanner are different.

The present invention provides an observation apparatus that allows LSM observation to be performed while correcting aberrations, as well as illumination with a desired pattern, using a single LCOS.

An aspect of the present invention is an observation apparatus including an objective lens that focuses illumination light emitted from a light source and radiates the illumination light onto a specimen; a spatial-light-modulating element that is disposed at a position optically conjugate with a pupil position of the objective lens and is capable of modulating the wavefront of the illumination light to be radiated onto the specimen by the objective lens; a scanning portion that is disposed at a position optically conjugate with the spatial-light-modulating element and is capable of two-dimensionally scanning the illumination light to be radiated onto the specimen by the objective lens; a focusing portion that adjusts the focal position, in the specimen, of the objective lens in the optical axis direction; and a control portion that controls the spatial-light-modulating element such that the spatial-light-modulating element corrects aberrations at the focal position and forms a desired illumination pattern on the specimen.

According to this aspect, by adjusting the focal position, in the specimen, of the objective lens in the optical axis direction with the focusing portion, the depthwise observation position in the specimen can be changed. In this case, by scanning, with the scanning portion, the illumination light having the wavefront thereof modulated by the spatial-light-modulating element, which is controlled by the control portion such that it corrects aberrations due to a refractive index distribution, etc. in the specimen, and by radiating the illumination light onto the specimen with the objective lens, a desired depth position of the specimen can be precisely observed.

Furthermore, by radiating the illumination light having the wavefront thereof modulated by the spatial-light-modulating element, which is controlled by the control portion so as to form a desired illumination pattern on the specimen, onto the specimen with the objective lens, a plurality of desired irradiation positions on the specimen can be simultaneously stimulated with light.

Therefore, according to the control of the spatial-light-modulating element by the control portion, it is possible to perform LSM observation while correcting aberrations, as well as illumination with a desired pattern, with a single spatial-light-modulating element.

In the above-described aspect, the objective lens, the scanning portion, and the spatial-light-modulating element may be arranged on the same optical path, and the control portion may perform the control of the spatial-light-modulating element for forming the desired illumination pattern while the scanning of illumination light by the scanning portion is stopped.

With this configuration, it is possible to fix the position where an illumination pattern is formed on the specimen. Accordingly, it is possible to simultaneously and precisely apply light stimulation to a plurality of irradiation positions on the specimen.

In the above-described aspect, the observation apparatus may further include a zero-order-light removing member disposed, in a manner capable of being inserted and removed, in an optical path between the spatial-light-modulating element and the scanning portion, at a position conjugate with the specimen, the zero-order-light removing member removing zero-order light contained in the illumination light having the wavefront thereof modulated by the spatial-light-modulating element, which is controlled by the control portion so as to form a desired illumination pattern.

The illumination light having the wavefront thereof modulated by the spatial-light-modulating element contains zero-order light, which is not influenced by the wavefront modulation, at the axial center thereof. Hence, a portion of the specimen near the position irradiated with the zero-order light in the stimulation light cannot be stimulated with light having a desired intensity distribution.

To counter this problem, when light stimulation is applied to the specimen, the zero-order-light removing member is inserted into the optical path to remove the zero-order light contained in the illumination light. By doing so, light stimulation with an unwanted illumination pattern can be prevented. When LSM observation of the specimen is performed, the zero-order-light removing member is removed from the optical path. By doing so, aberrations can be precisely corrected without being influenced by the zero-order-light removing member.

In the above-described aspect, the observation apparatus may further include an optical-path-splitting portion that splits the optical path between the spatial-light-modulating element and the scanning portion into two; and an optical-path-merging portion that merges, at a position between the scanning portion and the objective lens, the two optical paths split by the optical-path-splitting portion. The pupil position of the objective lens and the spatial-light-modulating element may be located at positions optically conjugate with each other in each of the two optical paths.

With this configuration, when LSM observation of the specimen is performed while correcting aberrations, the illumination light may be scanned and radiated onto the specimen in the optical path split by the optical-path-splitting portion in which the scanning portion is disposed. Furthermore, when light stimulation is applied to the specimen, pattern illumination may be performed on the specimen without using the scanning portion, in the optical path split by the optical-path-splitting portion in which the scanning portion is not disposed.

In this case, because there is no need to coordinate the control of the spatial-light-modulating element and the movement of the scanning portion, it is possible to increase the speed of switching between LSM observation while correcting aberrations and light stimulation of the specimen.

In the above-described aspect, the observation apparatus may further include a zero-order-light removing member disposed at a position conjugate with the specimen, in the optical path split by the optical-path-splitting portion in which the scanning portion is not provided, the zero-order-light removing member removing zero-order light contained in the illumination light having the wavefront thereof modulated by the spatial-light-modulating element, which is controlled by the control portion so as to form a desired illumination pattern.

With this configuration, it is possible to quickly switch between LSM observation while correcting aberrations and light stimulation of the specimen with a desired illumination pattern, without inserting or removing the zero-order-light removing member into or from the optical path.

In the above-described aspect, the optical-path-splitting portion may be disposed at a position conjugate with the specimen and may split the optical path of the illumination light coming from the spatial-light-modulating element into an optical path of a portion of the illumination light containing the zero-order light and an optical path of a portion of the illumination light not containing the zero-order light, and the scanning portion may be disposed in the optical path of the portion of the illumination light containing the zero-order light.

With this configuration, it is possible to perform LSM observation while correcting aberrations, as well as illumination with a desired pattern, without switching the control of the spatial-light-modulating element by the control portion between when aberrations at the focal position of the objective lens are corrected and when a desired illumination pattern is formed on the specimen.

The present invention has an advantage in that it allows LSM observation to be performed while correcting aberrations, as well as illumination with a desired pattern, using a single LCOS.

DESCRIPTION OF EMBODIMENTS

First Embodiment

An observation apparatus according to a first embodiment of the present invention will be described below with reference to the drawings.

Figure 1:
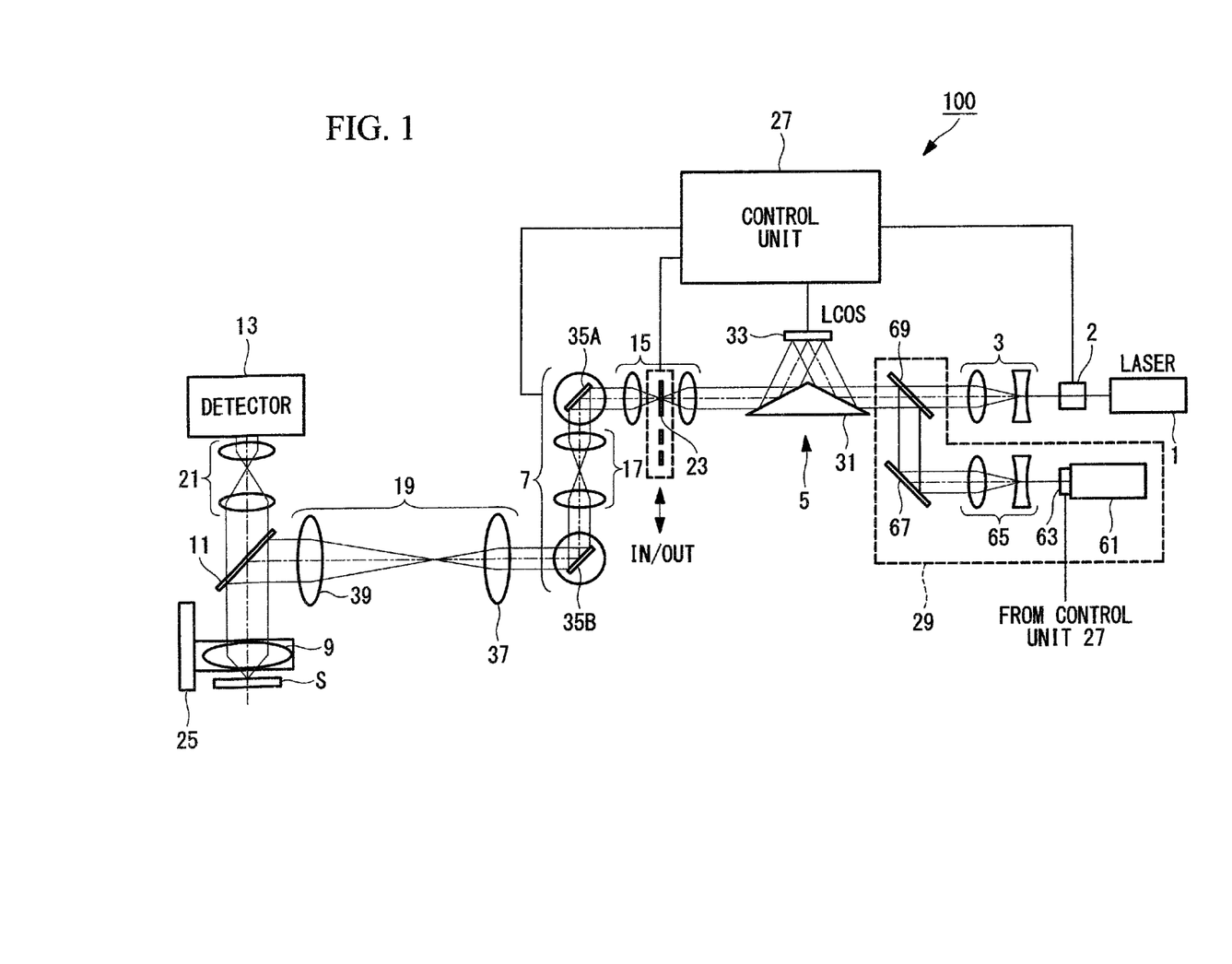
FIG. 1 is a diagram showing the overall configuration of an observation apparatus according to a first embodiment of the present invention.

As shown in FIG. 1, an observation apparatus 100 according to this embodiment includes a light source 1 that emits laser light (illumination light); an acousto-optic modulator (AOM) 2 that switches on or off the laser light emitted from the light source 1; a beam-converting optical system 3 that converts the wavefront of the laser light passing through the AOM 2 to a substantially plane wave; a wavefront modulating portion 5 that modulates the wavefront of the laser light converted to a substantially plane wave; a scanner (scanning portion) 7 that two-dimensionally scans the laser light; an objective lens 9 that irradiates a specimen S with the laser light and collects fluorescence generated in the specimen S; a dichroic mirror 11 that splits off the fluorescence from the specimen S collected by the objective lens 9 from the optical path of the laser light; and a detector 13, such as a photomultiplier tube, that detects the fluorescence split off by the dichroic mirror 11.

The observation apparatus 100 further includes a first relay optical system 15 disposed between the wavefront modulating portion 5 and the scanner 7; a second relay optical system 17 provided within the scanner 7; a third relay optical system 19 disposed between the scanner 7 and the dichroic mirror 11; a fourth relay optical system 21 disposed between the dichroic mirror 11 and the detector 13; a mask (zero-order-light removing member) 23 that removes zero-order light from the laser light relayed by the first relay optical system 15; a focusing mechanism (focusing portion) 25 that moves the objective lens 9 along the optical axis; a control unit (control portion) 27 that controls the AOM 2, the wavefront modulating portion 5, the scanner 7, and the mask 23; and a visible-laser-light-source portion 29 for single photon stimulation.

The light source 1 is, for example, a near-infrared ultrashort pulsed laser light source (IR pulsed laser light source) that induces multiphoton excitation.

The AOM 2 switches on or off the ultrashort pulsed laser light (hereinbelow, simply "laser light") emitted from the light source 1, according to instructions from the control unit 27.

The wavefront modulating portion 5 includes a prism 31 that reflects the laser light converted to a substantially plane wave by the beam-converting optical system 3; and a reflective liquid-crystal-on-silicon (LCOS) 33, serving as a spatial-light-modulating element, that reflects the laser light reflected by the prism 31 back to the prism 31.

The prism 31 reflects the laser light coming from the beam-converting optical system 3 to the LCOS 33 and reflects the laser light returning from the LCOS 33 toward a side opposite to the beam-converting optical system 3, along an optical path coaxial with an optical path of the laser light coming from the beam-converting optical system 3.

The LCOS 33 is formed of a segmented MEMS that can arbitrarily change the surface shape thereof according to instructions from the control unit 27. The LCOS 33 modulates the wavefront of the laser light so as to conform to the surface shape thereof when reflecting the laser light coming from the prism 31. Hereinbelow, an area in the LCOS 33 used to modulate the wavefront of the incident laser light will be referred to as a modulation area.

Furthermore, the LCOS 33 can, for example, focus the laser light on one point at the focal position of the objective lens 9 and can form a desired three-dimensional illumination pattern according to the surface shape of the modulation area. The surface shape of the modulation area in the LCOS 33 may be calculated or measured in advance, taking into consideration aberrations of various optical systems, the refractive index distribution in the specimen S, etc. Furthermore, the LCOS 33 is disposed at a position optically conjugate with the pupil position of the objective lens 9.

The scanner 7 includes two oscillating mirrors 35A and 35B arranged opposite each other. The scanner 7 causes the two oscillating mirrors 35A and 35B to oscillate about axes perpendicular to each other according to instructions from the control unit 27, thereby deflecting the laser light by a raster scanning movement. By doing so, the scanner 7 can two-dimensionally scan the laser light over the specimen S in response to the oscillation of the oscillating mirrors 35A and 35B.

The oscillation speed of one oscillating mirror, 35A, is set sufficiently higher than that of the other oscillating mirror, 35B. The high-speed oscillating mirror 35A is used to scan the specimen S in the X-direction, and the low-speed oscillating mirror 35B is used to scan the specimen S in the Y-direction, which is perpendicular to the X-direction. The oscillating mirrors 35A and 35B are made to oscillate about their axes by motors (not shown).

The dichroic mirror 11 reflects the laser light from the light source 1 to the objective lens 9, and allows fluorescence coming from the objective lens 9 to pass therethrough toward the detector 13.

The detector 13 outputs information about the intensity of the detected fluorescence. Based on the fluorescence-intensity information output from the detector 13 and information about the scanning position of the laser light scanned by the scanner 7 when the fluorescence is detected, a two-dimensional fluorescence image of the specimen S can be formed by a personal computer (PC) (not shown) or the like.

The first relay optical system 15 relays an image on the LCOS 33 of the wavefront modulating portion 5 to the oscillating mirror 35A of the scanner 7.

The second relay optical system 17 is disposed between the oscillating mirror 35A and the oscillating mirror 35B and relays the image on the oscillating mirror 35A to the oscillating mirror 35B.

The third relay optical system 19 relays the image on the oscillating mirror 35B to the pupil position of the objective lens 9.

Accordingly, the surface position of the LCOS 33, the surface position of the oscillating mirror 35A, and the surface position of the oscillating mirror 35B are all disposed at positions optically conjugate with the entrance pupil position of the objective lens 9.

Furthermore, the first relay optical system 15, the second relay optical system 17, the third relay optical system 19, and the fourth relay optical system 21 are all formed of a plurality of lenses. For example, the third relay optical system 19 is formed of a pupil projection lens 37 and an image-forming lens 39.

The mask 23 is disposed at a position conjugate with the specimen S, in the optical path of the laser light in the first relay optical system 15, in such a manner that it can be inserted and removed (IN/OUT).

The focusing mechanism 25 can adjust the focal position of the objective lens 9 on the specimen S, in the optical axis direction, by moving the objective lens 9 along the optical axis.

The visible-laser-light-source portion 29 includes a visible-laser-light source 61 that generates visible laser light, an acousto-optic tunable filter (AOTF) 63, a beam-converting optical system 65 that converts the wavefront of the laser light passing through the AOTF 63 to a substantially plane wave, a reflection mirror 67 that reflects the laser light converted to the substantially plane wave, and a dichroic mirror 69 that merges the laser light reflected by the reflection mirror 67 into the optical path of the laser light from the light source 1.

The control unit 27 includes a CPU (not shown) that controls the AOM 2, the motors for the scanner 7, the mask 23, the LCOS 33, the AOTF 63, etc.; a program for operating the CPU; and a memory that stores various signals to be input to the CPU.

As a result of the CPU executing the program, the control unit 27 outputs an on/off switching instruction signal to the AOM 2 to control switching between on and off states of the laser light. Furthermore, as a result of the CPU executing the program, the control unit 27 outputs an angle instruction signal to the motors for the scanner 7 to control the oscillation angles of the oscillating mirrors 35A and 35B. Furthermore, as a result of the CPU executing the program, the control unit 27 outputs an insertion/removal instruction signal to the mask 23 to control insertion into and removal from the optical path of the laser light.

Furthermore, as a result of the CPU executing the program, the control unit 27 outputs a shape instruction signal to the LCOS 33 to control the modulation area such that it has a predetermined surface shape. The control unit 27 also controls the LCOS 33 such that it corrects aberration at the focal position of the objective lens 9 and forms a desired illumination pattern on the specimen S.

For example, when multiphoton excitation observation of the specimen S is performed, the control unit 27 removes the mask 23 from the optical path of the laser light, causes the oscillating mirrors 35A and 35B of the scanner 7 to oscillate, and sets the surface shape of the LCOS 33 such that it modulates the wavefront of the laser light so as to be focused on one point at the focal position of the objective lens 9. The surface shape of the modulation area in the LCOS 33 is calculated or measured in advance, taking aberrations of the various optical systems, the refractive index distribution in the specimen S, etc. into consideration.

When the focal position of the objective lens 9 in the optical axis direction is changed by the focusing mechanism 25, on the basis of the information about the position of the focal position of the objective lens 9 in the depth direction with respect to the surface of the specimen S, which is read out from the focusing mechanism 25, the control unit 27 changes the surface shape of the modulation area in the LCOS 33 such that it corrects aberrations at the focal position of the objective lens 9.

Furthermore, when the specimen S is stimulated with light, the control unit 27 inserts the mask 23 into the optical path of the laser light, stops the oscillating mirrors 35A and 35B of the scanner 7, and sets the surface shape of the LCOS 33 such that it modulates the wavefront of the laser light so as to form a desired illumination pattern on the specimen S.

The operation of the observation apparatus 100 configured as above will now be described.

First, when multiphoton excitation observation of the specimen S is performed with the observation apparatus 100 according to this embodiment, the control unit 27 removes the mask 23 from the optical path of the laser light and activates the scanner 7 to cause the oscillating mirrors 35A and 35B to oscillate. In addition, the control unit 27 sets the surface shape of the LCOS 33 to a predetermined shape according to a desired depthwise observation position in the specimen S and causes the light source 1 to emit laser light.

The laser light emitted from the light source 1 passes through the AOM 2 and the beam-converting optical system 3 and enters the wavefront modulating portion 5 in the form of a substantially plane wave. In the wavefront modulating portion 5, the laser light is reflected by the prism 31 to the LCOS 33, is returned to the prism 31 with the wavefront thereof modulated by the LCOS 33, and is then reflected to the first relay optical system 15.

The laser light is relayed by the first relay optical system 15 to the scanner 7 and exits the scanner 7 via the oscillating mirrors 35A and 35B and the second relay optical system 17. In the scanner 7, by causing the high-speed oscillating mirror 35A to oscillate, the laser light reflected by the oscillating mirror 35A is scanned in the X-direction. By causing the low-speed oscillating mirror 35B to oscillate every time the oscillating mirror 35A completes scanning of one scanning line in the X-direction, the laser light reflected by the oscillating mirror 35B is scanned in the Y-direction. Thus, the scanning line is changed in the X-direction. The laser light is two-dimensionally scanned in this way.

The laser light scanned by the scanner 7 is relayed by the third relay optical system 19, is reflected by the dichroic mirror 11, is focused by the objective lens 9, and radiated onto the specimen S. In this way, the laser light is two-dimensionally scanned over the specimen S in response to the movement of the oscillating mirrors 35A and 35B of the scanner 7.

The fluorescence produced in the specimen S as a result of irradiation with the laser light is collected by the objective lens 9, passes through the dichroic mirror 11, is relayed by the fourth relay optical system 21, and is detected by the detector 13. That is, the fluorescence from the specimen S is not returned to the scanner 7 but is detected by the detector 13 (i.e., a non-descanning detection method).

By doing so, a two-dimensional image at a desired depthwise observation position in the specimen S can be formed by the PC or the like on the basis of the fluorescence-intensity information output from the detector 13 and the information about the scanning position of the laser light scanned by the scanner 7. By displaying the image formed by the PC on a monitor (not shown) or the like, multiphoton excitation observation of the specimen S can be performed.

Next, the focal position, in the optical axis direction, of the objective lens 9 on the specimen S is adjusted with the focusing mechanism 25 to change the observation position in the specimen S to the next sectional plane in the depth direction. In this case, because the focal point of the objective lens 9 is shifted due to a refractive index distribution in the specimen S or the like, the control unit 27 controls the LCOS 33 such that it corrects aberrations caused by the refractive index distribution in the specimen S or the like, on the basis of the position information provided by the focusing mechanism 25.

Then, the wavefront of the laser light is modulated by the LCOS 33 in which the surface shape of the modulation area is changed, such that it corrects aberrations at the focal position of the objective lens 9, and the resulting laser light is scanned by the scanner 7 and is radiated onto the specimen S by the objective lens 9. In this way, the next sectional plane of the specimen S in the depth direction can be precisely observed with a multiphoton excitation process.

In the same way, every time the observation position in the specimen S is changed by the focusing mechanism 25 in the depth direction, the control unit 27 controls the LCOS 33 such that it corrects aberrations at the focal position of the objective lens 9. Thus, the sectional planes of the specimen S at different depthwise positions can be precisely observed with a multiphoton excitation process.

Next, when multiphoton pattern stimulation is applied to the specimen S using the observation apparatus 100 according to this embodiment, the control unit 27 inserts the mask 23 into the optical path of the laser light and fixes the oscillating mirrors 35A and 35B of the scanner 7 to a normal position. Furthermore, the control unit 27 sets the surface shape of the LCOS 33 such that it modulates the wavefront of the laser light so as to form a desired illumination pattern on the specimen S, and then causes the light source 1 to emit laser light.

The laser light emitted from the light source 1 and subjected to the wavefront modulation by the LCOS 33 of the wavefront modulating portion 5 is relayed by the first relay optical system 15, during which the mask 23 removes zero-order light. Then, the laser light is reflected by the scanner 7, is relayed by the second relay optical system 17, and is radiated onto the specimen S by the objective lens 9 via the third relay optical system 19 and the dichroic mirror 11, As a result, a desired illumination pattern is formed at a desired position on the specimen S, according to the surface shape of the modulation area in the LCOS 33, and the specimen S is stimulated with light according to the illumination pattern. For example, it is possible to simultaneously perform multiphoton pattern stimulation at a plurality of desired positions in the specimen S, according to the surface shape of the modulation area in the LCOS 33.

By controlling the light source 1, the AOM 2, the LCOS 33, the mask 23, the scanner 7, etc. in turn with the control unit 27 to acquire an image of the specimen S stimulated with light, the user can observe a reaction of the specimen S caused by the multiphoton pattern stimulation with a multiphoton excitation process.

When single-photon pattern stimulation of the specimen S is performed with the observation apparatus 100 according to this embodiment, the visible-laser-light source 61 is made to emit laser light, instead of the light source 1. The laser light emitted from the visible-laser-light source 61 is merged, via the AOTF 63, the beam-converting optical system 65, and the reflection mirror 67, into the optical path of the laser light from the light source 1 by the dichroic mirror 69. The laser light emitted from the visible-laser-light source 61 and merged into the optical path of the laser light from the light source 1 is radiated onto the specimen S, similarly to the multiphoton pattern stimulation.

By doing so, a desired illumination pattern is formed at a desired position on the specimen S according to the surface shape of the modulation area in the LCOS 33, and the specimen S is stimulated with light according to the illumination pattern. By controlling the light source 1, the AOM 2, the LCOS 33, the mask 23, the scanner 7, etc. in turn with the control unit 27 to acquire an image of the specimen S stimulated with light, the user can observe a reaction of the specimen S caused by the single-photon pattern stimulation with a multiphoton excitation process.

As has been described above, with the observation apparatus 100 according to this embodiment, it is possible to perform multiphoton-excitation LSM observation while correcting aberrations, as well as to perform illumination with a desired pattern, using a single LCOS 33, according to the control of the LCOS 33 by the control unit 27. Furthermore, by stopping the activation of the scanner 7 when the multiphoton pattern stimulation or the single-photon pattern stimulation is applied to the specimen S, the position where the illumination pattern is formed on the specimen S is fixed. Thus, it is possible to apply precise light stimulation.

Furthermore, the laser light subjected to the wavefront modulation by the LCOS 33 contains, at the axial center, zero-order light, which is not influenced by the wavefront modulation. Hence, normally, a portion of the specimen S near the position irradiated with the zero-order light cannot be stimulated with light having a desired intensity distribution. However, by removing the zero-order light contained in the laser light with the mask 23, light stimulation with an unwanted illumination pattern can be prevented. When multiphoton excitation observation of the specimen S is performed, the mask 23 is removed from the optical path. By doing so, aberrations can be precisely corrected without being influenced by the mask 23.

Second Embodiment

Next, an observation apparatus according to the second embodiment of the present invention will be described.

Figure 2:
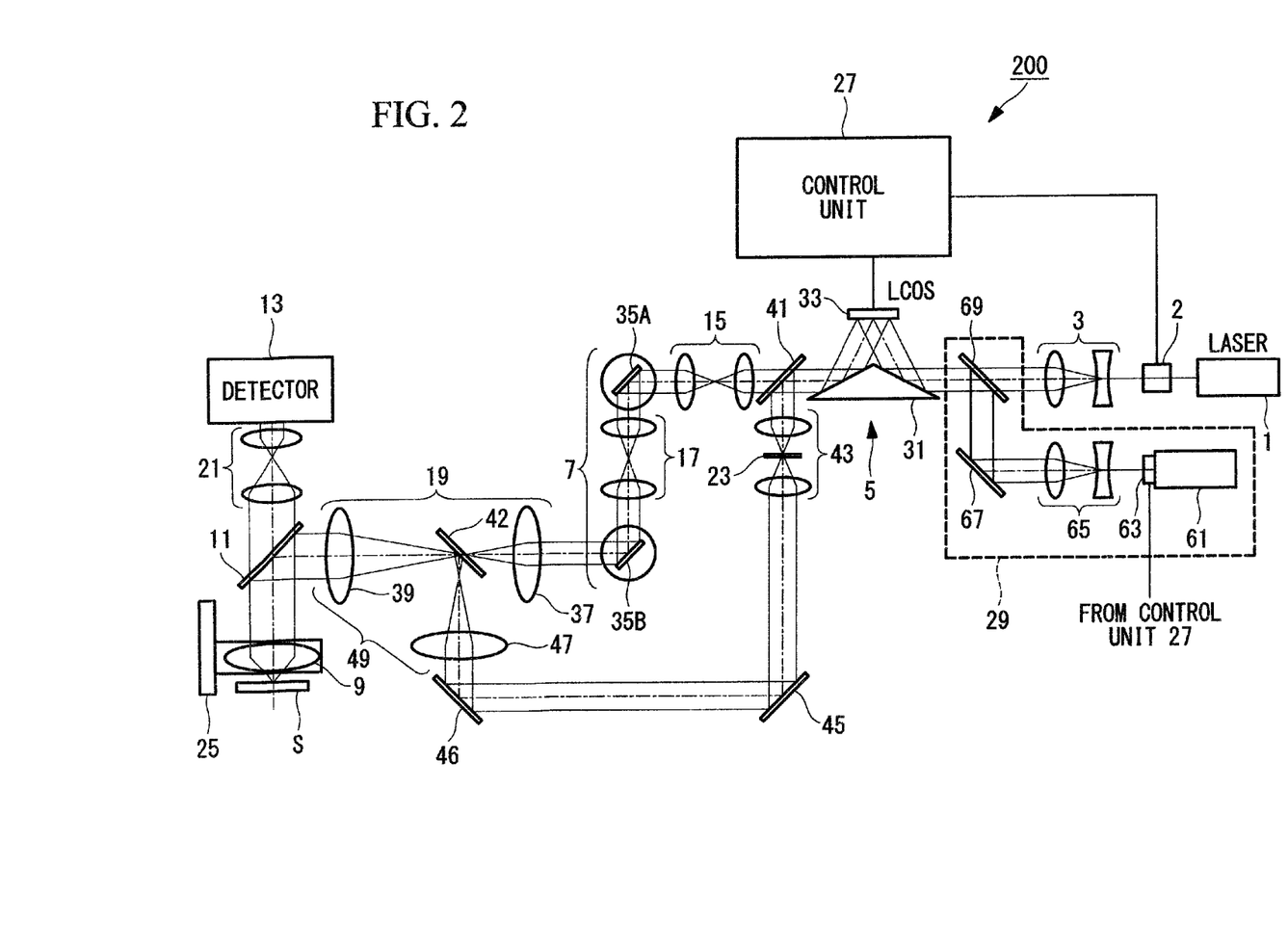
FIG. 2 is a diagram showing the overall configuration of an observation apparatus according to a second embodiment of the present invention.

As shown in FIG. 2, an observation apparatus 200 according to this embodiment differs from that according to the first embodiment in that it includes a splitting dichroic mirror (optical-path-splitting portion) 41 that splits the optical path between the wavefront modulating portion 5 and the scanner 7 into two, and a merging dichroic mirror (optical-path-merging portion) 42 that merges, at a position between the scanner 7 and the objective lens 9, the two optical paths split by the splitting dichroic mirror 41.

Hereinbelow, components having the same configuration as those in the observation apparatus 100 according to the first embodiment will be denoted by the same reference signs, and a description thereof will be omitted.

The splitting dichroic mirror 41 is disposed in an optical path between the wavefront modulating portion 5 and the first relay optical system 15. The splitting dichroic mirror 41 splits the optical path of the laser light by allowing laser light in a certain wavelength range to pass therethrough toward the first relay optical system 15, while reflecting laser light in other wavelength ranges.

The merging dichroic mirror 42 is disposed in the optical path between the pupil projection lens 37 of the third relay optical system 19 and the image-forming lens 39. The merging dichroic mirror 42 merges the optical path of the laser light by allowing the laser light in a certain wavelength range, which has passed through the splitting dichroic mirror 41, to pass therethrough toward the image-forming lens 39, while reflecting the laser light in other wavelength ranges, which has been reflected by the splitting dichroic mirror 41, toward the image-forming lens 39.

In the optical path of the laser light in the other wavelength ranges, which has been reflected by the splitting dichroic mirror 41, a fifth relay optical system 43 that relays the laser light coming from the splitting dichroic mirror 41, reflection mirrors 45 and 46 that reflect the laser light relayed by the fifth relay optical system 43, and a pupil projection lens 47 that focuses the laser light coming from the reflection mirror 46 and causes it to be incident on the merging dichroic mirror 42 are arranged.

The pupil projection lens 47 and the image-forming lens 39 of the third relay optical system 19 together form a sixth relay optical system 49. The fifth relay optical system 43 and the sixth relay optical system 49 relay an image on the LCOS 33 to the pupil position of the objective lens 9. The mask 23 is kept inserted in the optical path between the lenses of the fifth relay optical system 43, instead of between the lenses of the first relay optical system 15.

The control unit 27 keeps the scanner 7 activated either when multiphoton excitation observation of the specimen S is performed or when multiphoton pattern stimulation or single-photon pattern stimulation is applied to the specimen S.

The operation of the observation apparatus 200 having the above-described configuration will now be described.

When multiphoton excitation observation of the specimen S is performed with the observation apparatus 200 according to this embodiment, the control unit 27 activates the scanner 7 to cause the oscillating mirrors 35A and 35B to oscillate and sets the surface shape of the LCOS 33 to a predetermined shape, according to the desired depthwise observation position in the specimen S. Then, the control unit 27 controls the AOM 2 to make the light source 1 emit laser light in a wavelength range passing through the splitting dichroic mirror 41.

The laser light emitted from the light source 1 passes through the splitting dichroic mirror 41 via the beam-converting optical system 3 and the wavefront modulating portion 5 and is two-dimensionally scanned by the scanner 7 via the first relay optical system 15 and the second relay optical system 17. The laser light scanned by the scanner 7 passes through the merging dichroic mirror 42 via the pupil projection lens 37 and is radiated onto the specimen S by the objective lens 9 via the image-forming lens 39 and the dichroic mirror 11.

In this way, similarly to the first embodiment, it is possible to detect fluorescence produced by the specimen S with the detector 13 and form an image thereof with a PC, and to perform multiphoton excitation observation of the specimen S.

When the depthwise focal position of the objective lens 9 in the specimen S is changed by the focusing mechanism 25, similarly to the first embodiment, the control unit 27 controls the LCOS 33 so as to correct the aberrations caused by the refractive index distribution in the specimen S or the like, on the basis of the position information provided by the focusing mechanism 25.

As a result, the laser light with the wavefront thereof modulated so as to correct aberrations at the focal position of the objective lens 9 by the LCOS 33 in which the surface shape of the modulation area is changed is scanned by the scanner 7 and is radiated onto the specimen S by the objective lens 9. Accordingly, the sectional planes of the specimen S at different depthwise positions can be precisely observed with a multiphoton excitation process.

Next, when multiphoton pattern stimulation is applied to the specimen S using the observation apparatus 200 according to this embodiment, the control unit 27 sets the surface shape of the LCOS 33 such that it modulates the wavefront of the laser light so as to form a desired illumination pattern on the specimen S, while keeping the oscillating mirrors 35A and 35B of the scanner 7 oscillating. Then, the control unit 27 controls the AOM 2 to emit laser light in a wavelength range reflected by the splitting dichroic mirror 41.

The laser light emitted from the light source 1 and subjected to the wavefront modulation by the LCOS 33 of the wavefront modulating portion 5 is reflected by the splitting dichroic mirror 41. Then, the laser light is relayed by the fifth relay optical system 43, during which the mask 23 removes zero-order light, and is focused by the pupil projection lens 37 via the reflection mirrors 45 and 46.

The laser light focused by the pupil projection lens 47 is reflected by the merging dichroic mirror 42 and is radiated onto the specimen S by the objective lens 9 via the image-forming lens 39 and the dichroic mirror 11.

Thus, it is possible to form a desired illumination pattern at a desired position on the specimen S according to the surface shape of the modulation area in the LCOS 33 and to apply multiphoton pattern stimulation to the specimen S according to the illumination pattern.

When single-photon pattern stimulation of the specimen S is performed with the observation apparatus 200 according to this embodiment, the control unit 27 controls the AOTF 63, instead of the AOM 2, such that it emits laser light in a wavelength range reflected by the splitting dichroic mirror 41. The laser light emitted from the visible-laser-light source 61 is merged into the optical path of the laser light from the light source 1 by the dichroic mirror 69 and is then radiated onto the specimen S, similarly to the multiphoton pattern stimulation. Thus, single-photon pattern stimulation of the specimen S can be performed with the desired illumination pattern formed according to the surface shape of the modulation area in the LCOS 33.

As has been described above, with the observation apparatus 200 according to this embodiment, when performing multiphoton-excitation LSM observation of the specimen S while correcting aberrations, the laser light may be scanned by the scanner 7 and radiated onto the specimen S in the optical path split by the splitting dichroic mirror 41 in which the scanner 7 is disposed. When applying multiphoton pattern stimulation or single-photon pattern stimulation to the specimen S, pattern illumination may be performed on the specimen S without using the scanner 7, in the optical path split by the splitting dichroic mirror 41 in which the scanner 7 is not disposed.

In this case, because there is no need to coordinate the control of the LCOS 33, the activation of the scanner 7, and insertion/removal of the mask 23, it is possible to increase the speed of switching between multiphoton-excitation LSM observation while correcting aberrations, and multiphoton pattern stimulation or single-photon pattern stimulation of the specimen S and, thus, to reduce the time lag between multiphoton excitation observation and light stimulation.

Although the splitting dichroic mirrors 41 and 435 have been described as an example optical-path-splitting portion and optical-path-merging portion in this embodiment, half mirrors may be used as the optical-path-splitting portion and optical-path-merging portion instead.

This embodiment may be modified as follows.

Figure 3:
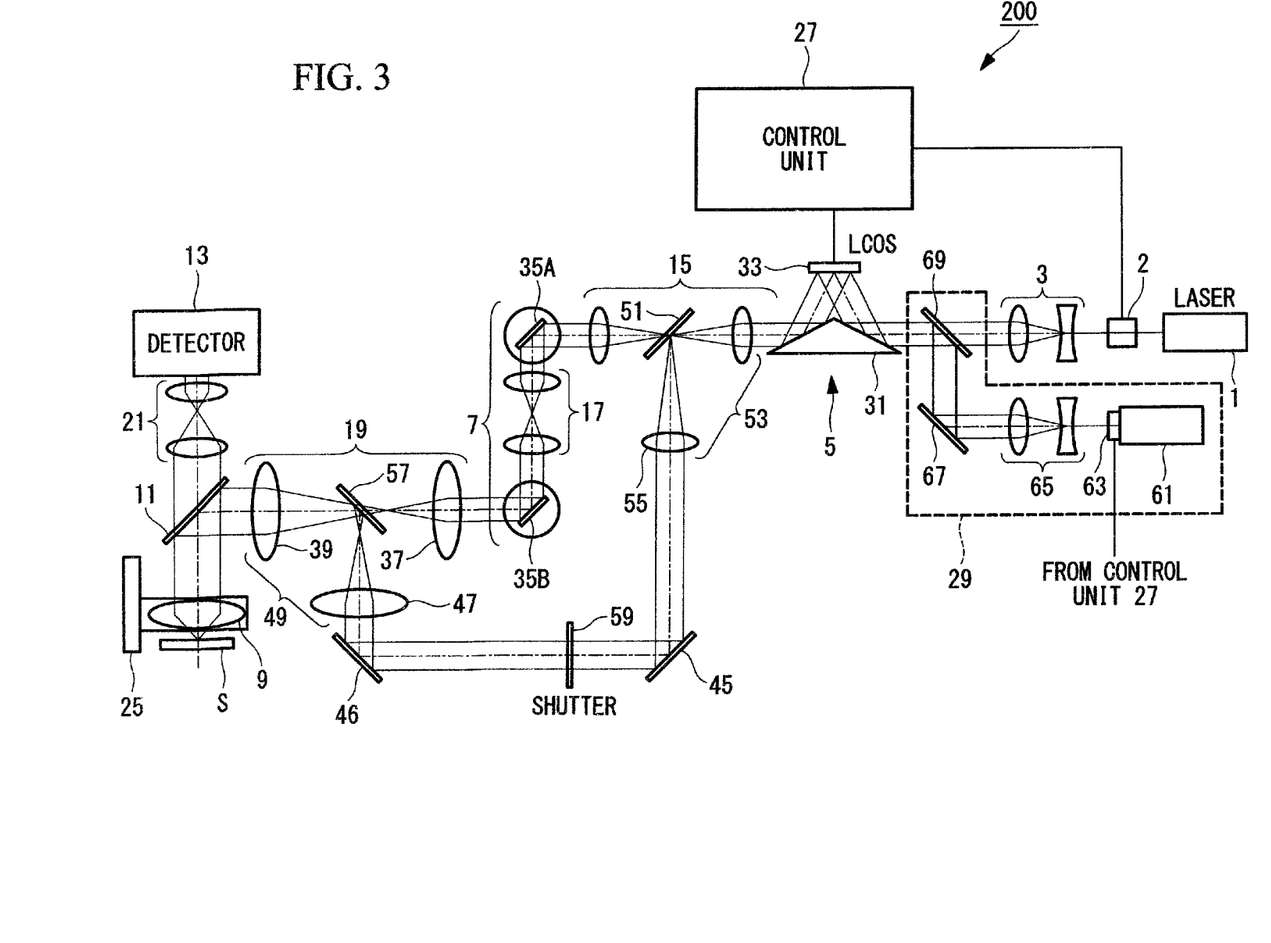
FIG. 3 is a diagram showing the overall configuration of an observation apparatus according to a modification of the second embodiment of the present invention.

Specifically, although the splitting dichroic mirror 41 has been used as the optical-path-splitting portion in the second embodiment, in one modification, for example, as shown in FIG. 3, a ring-shaped mirror 51 having a through-hole that allows only a portion of the laser light containing zero-order light, among the laser light subjected to wavefront modulation by the wavefront modulating portion 5, to pass through may be used as the optical-path-splitting portion.

The ring-shaped mirror 51 may be, for example, in the shape of a ring having a through-hole at the center. The ring-shaped mirror 51 may be disposed at a position conjugate with the specimen S and configured to allow zero-order light contained in the axial center and a portion of the laser light around the zero-order light, among the laser light coming from the wavefront modulating portion 5, to pass through the through-hole toward the scanner 7, while reflecting the laser light on the outer side of the aforementioned laser light, i.e., the laser light that does not contain zero-order light or the portion of the laser light around the zero-order light.

Furthermore, the first relay optical system 15 may be formed of two lenses, and the ring-shaped mirror 51 may be disposed at a position between the two lenses, the position conjugate with the image-forming position of the objective lens 9. Furthermore, a lens 55 that forms a seventh relay optical system 53 with one of the lenses in the first relay optical system 15 may be used instead of the fifth relay optical system 43. Furthermore, a half mirror 57 may be used as the optical-path-merging portion instead of the merging dichroic mirror 42. Furthermore, a shutter 59 that can switch between passing and blocking of the laser light may be provided on the optical path between the reflection mirrors 45 and 46.

With this configuration, the optical path of the laser light subjected to the wavefront modulation by the wavefront modulating portion 5 is split by the ring-shaped mirror 51 into an optical path of a portion of the laser light containing zero-order light and an optical path of a portion of the laser light not containing zero-order light. Then, the portion of the laser light passing through the ring-shaped mirror 51 and containing the zero-order light is two-dimensionally scanned over the specimen S by the scanner 7, and the portion of the laser light reflected by the ring-shaped mirror 51 and not containing the zero-order light is radiated onto the specimen S without passing through the scanner 7.

Accordingly, when correcting aberrations at the focal position of the objective lens 9 and forming a desired illumination pattern on the specimen S, there is no need to switch between the control of the LCOS 33 and the control of the AOM 2 by the control unit 27, and it is possible to perform multiphoton-excitation LSM observation while correcting aberrations, as well as to perform illumination with a desired pattern, with the same laser light. In this case, while performing the multiphoton pattern stimulation or the single-photon pattern stimulation of the specimen S, the laser light may be allowed to pass by the shutter 59, and while acquiring an image of the specimen S, the laser light may be blocked by the shutter 59 to stop the multiphoton pattern stimulation or the single-photon pattern stimulation. In this modification, because the ring-shaped mirror 51 serves also for the function of removing zero-order light from the laser light used for multiphoton pattern stimulation or single-photon pattern stimulation, a mask serving as a zero-order-light removing member is unnecessary.

Although the embodiments of the present invention have been described in detail with reference to the drawings, the specific configurations are not limited to the embodiments described above, and design changes, etc. that do not depart from the scope of the present invention are also included. For example, the present invention does not necessarily have to be applied to each of the above-described embodiments, but may be applied to an embodiment achieved by appropriately combining the above-described embodiments; it is not specifically limited. Furthermore, although the second relay optical system 17 is disposed between the oscillating mirrors 35A and 35B of the scanner 7 in the above-described embodiments, the oscillating mirrors 35A and 35B may be arranged close to each other, without the second relay optical system 17.

REFERENCE SIGNS LIST 1 light source
7 scanner (scanning portion)
9 objective lens
23 mask (zero-order-light removing member)
25 focusing mechanism (focusing portion)
27 control unit (control portion)
33 LCOS (spatial-light-modulating element)
41 splitting dichroic mirror (optical-path-splitting portion)
42 merging dichroic mirror (optical-path-merging portion)
51 ring-shaped mirror (optical-path-splitting portion)
57 half mirror (optical-path-merging portion)
100, 200 observation apparatus
S specimen

The invention claimed is:

1. An observation apparatus comprising:
an objective lens that focuses illumination light emitted from a light source and radiates the illumination light onto a specimen;
a spatial-light-modulating element that is disposed at a position optically conjugate with a pupil position of the objective lens and is capable of modulating a wavefront of the illumination light to be radiated onto the specimen by the objective lens;
a scanning portion that is disposed at a position optically conjugate with the spatial-light-modulating element and is capable of two-dimensionally scanning the illumination light to be radiated onto the specimen by the objective lens;
a focusing portion that adjusts a focal position, in the specimen, of the objective lens in an optical axis direction; and
a control portion that controls the spatial-light-modulating element such that the spatial-light-modulating element corrects aberrations at the focal position and forms a predetermined illumination pattern on the specimen.

2. The observation apparatus according to claim 1, wherein:
the objective lens, the scanning portion, and the spatial-light-modulating element are arranged on a same optical path, and
the control portion performs the control of the spatial-light-modulating element for forming the predetermined illumination pattern while the scanning of illumination light by the scanning portion is stopped.

3. The observation, apparatus according to claim 1, further comprising a zero-order-light removing member disposed, in a manner capable of being inserted and removed, in an optical path between the spatial-light-modulating element and the scanning portion, at a position conjugate with the specimen, the zero-order-light removing member removing zero-order light contained in the illumination light having the wavefront thereof modulated by the spatial-light-modulating element, which is controlled by the control portion so as to form the predetermined illumination pattern.

4. The observation apparatus according to claim 1, further comprising:
an optical-path-splitting portion that splits an optical path between the spatial-light-modulating element and the scanning portion into two; and
an optical-path-merging portion that merges, at a position between the scanning portion and the objective lens, the two optical paths split by the optical-path-splitting portion,
wherein the pupil position of the objective lens and the spatial-light-modulating element are located at positions optically conjugate with each other in each of the two optical paths.

5. The observation apparatus according to claim 4, further comprising a zero-order-light removing member disposed at a position conjugate with the specimen, in the optical path split by the optical-path-splitting portion in which the scanning portion is not provided, the zero-order-light removing member removing zero-order light contained in the illumination light having the wavefront thereof modulated by the spatial-light-modulating element, which is controlled by the control portion so as to form the predetermined illumination pattern.

6. The observation apparatus according to claim 4, wherein:
the optical-path-splitting portion is disposed at a position conjugate with the specimen and splits the optical path of the illumination light coming from the spatial-light-modulating element into an optical path of a portion of the illumination light containing the zero-order light and an optical path of a portion of the illumination light not containing the zero-order light, and
the scanning portion is disposed in the optical path of the portion of the illumination light containing the zero-order light.

* * * * *